United States Patent
Ono et al.

(10) Patent No.: US 7,147,943 B2
(45) Date of Patent: Dec. 12, 2006

(54) MAGNETIC RECORDING MEDIUM, THE MANUFACTURING METHOD AND MAGNETIC RECORDING APPARATUS USING THE SAME

(75) Inventors: Toshinori Ono, Odawara (JP); Yuuichi Kokaku, Yokohama (JP); Hiroyuki Matsumoto, Chigasaki (JP); Hiroshi Tani, Ninomiya (JP); Mitsuhiro Shoda, Odawara (JP); Tomonori Kozaki, Odawara (JP); Hiroshi Ishikawa, Numazu (JP); Toru Yatsue, Odawara (JP); Yoshinori Honda, Hiratsuka (JP); Shigehiko Fujimaki, Machida (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 96 days.

(21) Appl. No.: 10/429,704

(22) Filed: May 6, 2003

(65) Prior Publication Data
US 2004/0028949 A1 Feb. 12, 2004

Related U.S. Application Data

(63) Continuation-in-part of application No. 09/784,952, filed on Feb. 16, 2001.

(30) Foreign Application Priority Data
Sep. 4, 2002 (JP) ............................. 2002-258389

(51) Int. Cl.
  G11B 5/66 (2006.01)
  G11B 5/70 (2006.01)
(52) U.S. Cl. .................... 428/835; 428/833.2
(58) Field of Classification Search ............ 428/694 T, 428/694 TP, 833.3, 833.2, 835, 835.4, 835.7
See application file for complete search history.

(56) References Cited

U.S. PATENT DOCUMENTS 5,432,012 A * 7/1995 Lal et al. ..................... 428/610
6,299,425 B1 * 10/2001 Hirano et al. .................. 418/63
6,303,214 B1 * 10/2001 Chour et al. ................. 428/212

* cited by examiner

Primary Examiner—Holly Rickman
(74) Attorney, Agent, or Firm—Antonelli, Terry, Stout and Kraus, LLP.

(57) ABSTRACT

This magnetic recording medium is characterized in that in the magnetic recording medium having a magnetic layer on a non-magnetic substrate by intercalating at least an under layer, the proportion of functional groups per 100 carbon atoms in a diamond-like carbon protective layer mainly composed of carbon for protecting the magnetic layer exceeds 20%. The bonding force between the protective layer and the lubricating layer of the magnetic recording medium is increased so that under high speed rotation, a decrease in the lubricating layer is not caused so as to provide a magnetic recording apparatus having high reliability.

7 Claims, 8 Drawing Sheets

FIG. 3

| | THICKNESS OF PROTECTIVE LAYER (nm) | THE THICKNESS OF LUBRICANT LAYER IN THE EARLY STAGE (nm) | THE RATIO OF THE SURFACE FUNCTIONAL GROUP | L/UL EXAM RESULT | THE THICKNESS OF LUBRICANT LAYER AFTER THE EXAM (nm) |
|---|---|---|---|---|---|
| MAGNETIC RECORDING MEDIUM ACQUIRED BY EXAMPLE 1 | | | | | |
| 1 | 3.0 | 2.2 | 32 | ○ | 2.1 |
| 2 | 3.0 | 2.2 | 28 | ○ | 2.1 |
| 3 | 3.0 | 2.2 | 26 | ○ | 2.1 |
| 4 | 3.0 | 2.2 | 23 | ○ | 2.1 |
| 5 | 3.0 | 2.2 | 38 | ○ | 2.1 |
| 6 | 3.0 | 2.2 | 35 | ○ | 2.1 |
| 7 | 3.0 | 2.2 | 30 | ○ | 2.1 |
| 8 | 3.0 | 2.2 | 31 | ○ | 2.1 |
| 9 | 3.0 | 2.2 | 29 | ○ | 2.1 |
| 10 | 3.0 | 2.2 | 28 | ○ | 2.1 |
| MAGNETIC RECORDING MEDIUM ACQUIRED BY COMPARATIVE EXAMPLE | | | | | |
| 11 | 3.0 | 2.2 | 15 | CRASH IN 1100 ROTATION | 0.8 |
| 12 | 3.0 | 2.2 | 14 | CRASH IN 1200 ROTATION | 0.8 |
| 13 | 3.0 | 2.2 | 18 | CRASH IN 1400 ROTATION | 1 |
| 14 | 3.0 | 2.2 | 18 | CRASH IN 5000 ROTATION | 1.1 |
| 15 | 3.0 | 2.2 | 20 | CRASH IN 8000 ROTATION | 1.2 |
| 16 | 3.0 | 2.2 | 17 | CRASH IN 1600 ROTATION | 1 |
| 17 | 3.0 | 2.2 | 15 | CRASH IN 1500 ROTATION | 1 |
| 18 | 3.0 | 2.2 | 16 | CRASH IN 1400 ROTATION | 0.8 |
| 19 | 3.0 | 2.2 | 19 | CRASH IN 3000 ROTATION | 0.8 |
| 20 | 3.0 | 2.2 | 19 | CRASH IN 4200 ROTATION | 0.8 |

BILATERALLY SYMMETRICAL

FIG.10

| SAMPLE No. | PROPORTION OF HYDROGEN ATOMS ON SURFACE OF DLC(at.%) | PROPORTION OF HYDROGEN ATOMS IN DLC FILM (at.%) | PROPORTION OF NITROGEN ATOMS IN DLC FILM (at.%) | DEPOSITION THICKNESS OF LUBRICANT (nm) | THICKNESS OF FIXED LAYER OF LUBRICANT (nm) | GLIDE NOISE (mV) | LOW-FLOATING STABILITY | THICKNESS OF LUBRICANT AFTER RELIABILITY TEST(nm) | SLIDE RESISTANCE RELIABILITY |
|---|---|---|---|---|---|---|---|---|---|
| 3 | 25 | 37 | 4.8 | 1.7 | 1.1 | 11 | OK | 1.6 | OK |
| 4 | 35 | 37 | BELOW DETECTION LIMIT | 1.1 | 0.4 | 53 | NG | 0.6 | NG |
| 5 | 31 | 36 | 4.1 | 1.6 | 1 | 55 | NG | 1.5 | OK |
| 6 | 32 | 36 | BELOW DETECTION LIMIT | 1 | 0.4 | 42 | NG | 0.5 | NG |
| 7 | 32 | 37 | 2.3 | 1.4 | 0.8 | 38 | NG | 1.2 | △ |
| 8 | 27 | 37 | 4.6 | 1.7 | 1.1 | 15 | OK | 1.6 | OK |
| 9 | 29 | 39 | 4.5 | 1.7 | 1.1 | 18 | OK | 1.5 | OK |
| 10 | 30 | 40 | 4.5 | 1.6 | 1.1 | 25 | OK | 1.5 | OK |

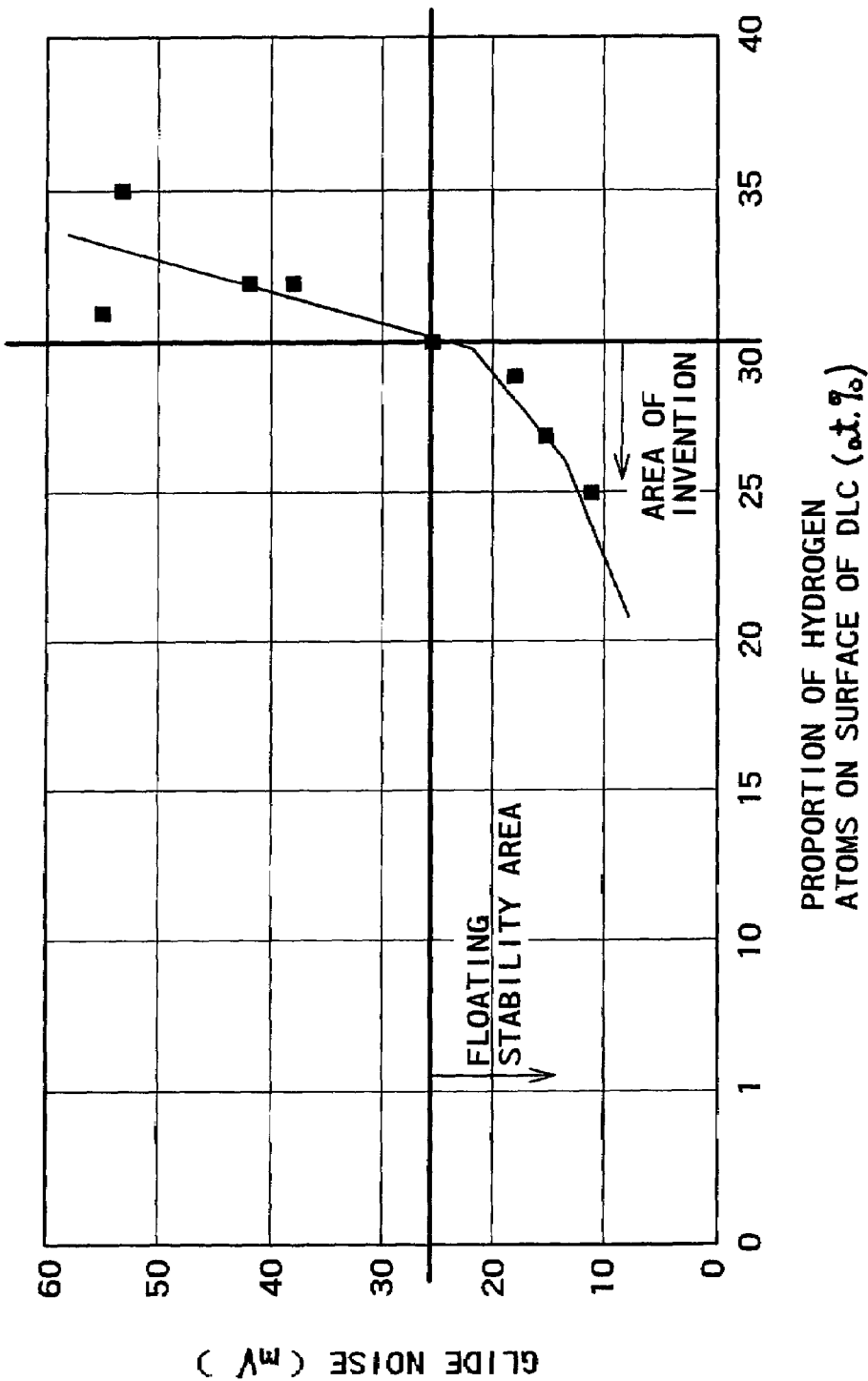

MAGNETIC RECORDING MEDIUM, THE MANUFACTURING METHOD AND MAGNETIC RECORDING APPARATUS USING THE SAME

This is a Continuation-In-Part application of Ser. No. 09/784,952 filed Feb. 16, 2001, the disclosure of which is hereby incorporated by reference.

BACKGROUND OF THE INVENTION

This invention relates to a magnetic recording medium which has excellent reliability and in which magnetic recording is performed with high density, a manufacturing method thereof and a magnetic disc device used in an auxiliary storage apparatus of a computer.

A magnetic disc apparatus used in a storage apparatus of a large-scale computer, a work station, a personal computer and the like has been yearly increased in its importance and developed into a mass-stored and small sized device. Increasing of recording density is essential to the development of the magnetic disc apparatus into mass-stored and small-sized apparatus. As the technology for realizing the development into the mass-stored and small-sized device, cited is reduction in distance between a magnetic recording layer of a magnetic recording medium and a magnetic head.

The magnetic recording medium manufactured by sputtering has been provided with a protective layer heretofore for the purpose of protecting a magnetic layer from sliding of a magnetic head. Thinning of the protective layer and reduction of distance between the surface of the protective layer and the magnetic head are the most effective means for more decreasing the distance between a magnetic recording layer and the magnetic head. For this protective layer, carbon manufactured by DC sputtering, RF sputtering (Japanese Patent Laid Open Hei 5-174369), or CVD (Japanese Patent Laid-Open No. Hei 4-90125) is most generally used, and a method of mixing nitrogen atoms, hydrogen atoms and the like in the film to obtain a protective layer more excellent in strength (Japanese Patent Laid-Open No. Sho 62-246129) has been generally adopted.

Various attempts are being made to improve the productivity and slide resistance of a DLC layer. For example, a C:N protective layer is formed on a magnetic layer and a DLC layer is further formed on the protective layer in Japanese Laid-open Patent Application No. Hei 6-84168. In Japanese Laid-open Patent Application No. Hei 11-175960, an attempt is made to add nitrogen in the latter half to the final stages of the formation of a DLC layer. However, the DLC protective layers obtained by these methods cannot achieve satisfactory slide resistance when the thickness of the layer is smaller than 4 nm. When the floating height of a magnetic head is reduced to around 10 nm, contact between the magnetic head and a magnetic recording medium occurs intermittently, whereby floating is not stabilized with the result that writing and reading become impossible.

Further, it is general to use perfluoropolyether liquid lubricant for the purpose of reducing friction between the magnetic head and the magnetic recording medium.

As a general method for thinning, cited is to apply diamond-like carbon (DLC) using ion beam deposition (IBD) or chemical vapor deposition (CVD). for a protective layer. DLC, however, bonding strength of carbon atoms and hydrogen atoms in the thin layer is generally strong and also its network has higher continuity as compared with the carbon protective layer provided by the sputtering. Therefore, the problem is that the bonding strength to perfluoropolyether lubricant applied to the protective layer is weak owing to fewer functional groups.

One of performance indexes of the magnetic recording device using the magnetic recording medium is the data transfer rate. The data transfer rate largely depends on the data access time. The access time is composed of the seek time and the rotation waiting time, and to shorten the rotation waiting time by increasing the rotating speed of a magnetic recording medium leads to the improvement in the data transfer rate.

When the rotating speed of the magnetic recording medium is increased, however, centrifugal force is applied to the liquid lubricant on the DLC protective layer of the magnetic recording medium so that as the result of the problem that the bonding strength is weak, the liquid lubricant is driven away toward the outer peripheral part of the magnetic recording medium until it is shaken off from the magnetic recording medium (hereinafter referred to as spin-off). Consequently, the problem encountered is that the lubricant on the magnetic recording medium is decreased to increase the frictional force between the magnetic recording medium and the magnetic head and cause a crash.

In order to solve the problems, attempts have been made to apply surface treatment to the protective layer so as to increase the bonding strength. Japanese Patent Laid-Open No. Sho 62-150526 and Japanese Patent Laid-Open No. Sho 63-2117 disclose that the surface is subjected to plasma treatment. Japanese Patent Laid-Open No. Hei 4-6624 discloses that the surface is subjected to ultraviolet treatment, water treatment, ozonization or the like. Further, Japanese Patent Laid-Open No. Sho 63-2117, Japanese Patent Laid-Open No. Hei 9-30596, Japanese Patent Laid-Open No. Hei 8-225791, Japanese Patent Laid-Open No. Hei 7-210850 and Japanese Patent Laid-Open No. Hei 5-174354 are similar to the above, and all of these disclose that after the protective layer is formed, the surface thereof is subjected to some treatment. These methods, however, have the problem that it is difficult to uniformly treat the whole surface, one additional process is needed in the work, and besides the adhesion of the lubricant is insufficient.

There is generally employed a method of adding a nitrogen gas in addition to a hydrocarbon gas as a raw material in order to provide functional groups including a nitrogen atom to the protective layer. However, most of the nitrogen atoms absorbed into the DLC protective layer form a triple bond with a carbon atom, so-called nitrile group ($-C\equiv N$) and are hardly chemically bonded to a lubricant, thereby making it impossible to increase bonding force with the lubricant.

SUMMARY OF THE INVENTION

The present invention has been made in view of the above circumstances and provides a magnetic recording medium which is increased in the chemical bonding strength of a protective layer and liquid lubricant not to cause a decrease in liquid lubricant due to spin-off under high speed rotation.

Further, the invention provides a magnetic recording medium which ensures stable floating without intermittent contact between a magnetic head and a magnetic recording medium even when the floating height of the magnetic head is reduced to about 10 nm, thereby making possible stable writing and reading.

Further, the invention provides a manufacturing method for the above magnetic recording medium.

Further, the invention provides a magnetic storage apparatus suitable for reconciling high speed rotation and high reliability by using the above magnetic recording medium.

To solve the above problems, the invention mainly adopts the following constitution.

According to the invention, a magnetic recording medium is characterized in that the magnetic recording medium has a magnetic layer formed on a non-magnetic substrate by intercalating at least an under layer, and the proportion of functional groups per 100 carbon atoms in the diamond-like carbon protective layer mainly composed of carbon, which protects the magnetic layer, exceeds 20%.

The content of hydrogen in a portion from the surface to a depth of 1 nm of the protective layer is made lower than the content of hydrogen in a portion from the 1 nm surface layer to the magnetic layer side of the protective layer. Preferably, the content of hydrogen in a portion from the surface to a depth of 1 nm is not higher than 30 at. %. The reason for this is that when the content of hydrogen is higher than 30 at. %, the flyability of the magnetic head deteriorates.

The proportion of nitrogen atoms to carbon atoms in the DLC layer is preferably 4% or more. By setting the proportion of nitrogen atoms to 4% or more, bonding force with a lubricant can be sufficiently increased.

In the case where a lubricating layer of perfluoropolyether having at least one functional group is provided on the protective layer, bonding performance between the protective layer and the lubricating layer is excellent.

According to the invention, a manufacturing method for the magnetic recording medium is characterized in that in the manufacturing method for the magnetic recording medium having a magnetic layer formed on a non-magnetic substrate by intercalating at least an under layer, when a protective layer mainly composed of carbon for protecting the magnetic layer is formed by an ion beam method or a chemical vapor deposition method, at least one gas among $CO_2$, $NO_2$, $N_2O$ is added.

In the case where the protective layer is diamond-like carbon, the bonding performance between the protective layer and the lubricating layer is especially improved.

In the case of forming the protective layer by the ion beam method or the chemical vapor deposition method, it is preferable to use at least one of N2, Ne, Ar, Kr and Xe and hydrocarbon gas or hydrocarbon gas.

In the manufacturing method for the magnetic recording medium having a magnetic layer formed on a non-magnetic substrate by intercalating at least an under layer, at the time of forming a diamond-like carbon protective layer mainly composed of carbon for protecting the magnetic layer by an ion beam method or a chemical vapor deposition method, one gas among $CO_2$, $NO_2$, $N_2O$ may be added.

The following method may also be employed to improve the flyability of a magnetic head.

In the method of manufacturing a magnetic recording medium comprising the step of sequentially forming a magnetic layer and a protective layer on a substrate by intercalating at least an under layer, the protective layer is a diamond-like carbon (DLC) layer mainly composed of carbon and formed by an ion beam deposition method or a chemical vapor deposition method. In this method, the supply of a carbon atom or a raw material containing a carbon atom is reduced stepwise or continuously. The raw material containing a carbon atom is a hydrocarbon gas. As means of supplying the raw material, a method in which a raw material gas is introduced into a layer forming apparatus and its flow rate is adjusted and a method in which the partial pressure of the raw material gas is gradually adjusted are available.

The purposes of reducing the raw material gas stepwise or continuously are given below. First, the contribution of a nondecomposed material to layer formation is prevented by reducing the supply of a material at the time of forming a layer around the 1 nm surface layer which is the final stage of the layer forming process. That is, the 1 nm surface layer of the protective layer is formed by the ions of the hydrocarbon gas decomposed mainly by plasma, thereby making it possible to reduce the content of hydrogen. Second, the layer forming rate is accelerated by increasing the supply of a material at the beginning, that is, at the time of forming a portion between the 1 nm surface layer and the interface with the magnetic layer in order not to sacrifice productivity.

Nitrogen atoms can be contained in the DLC layer in the above proportion by adding a nitrous oxide gas in addition to the supply of the hydrocarbon gas material. The nitrogen atom contained in the DLC layer is existent as a functional group capable of increasing bonding force with a lubricant and not a nitrile group. Further, an oxygen atom contained in the nitrous oxide gas is bonded to a hydrogen atom contained in the DLC layer during plasma to become a water molecule which is then discharged, thereby reducing the content of hydrogen contained in the DLC layer.

At least one of Ne, Ar, Kr and Xe may be used as a carrier gas.

According to the invention, a magnetic storage device is characterized that the device includes the magnetic recording medium, a driving part for driving the magnetic recording medium, a magnetic head having a recording part and a reproducing part, a recording reproducing signal processing part for giving and receiving a signal to and from the magnetic head, and a magnetoresistive head as a reproducing part of the magnetic head.

BRIEF DESCRIPTION OF THE DRAWINGS

Preferred embodiments of the present invention will be described in detail based on the followings, wherein

FIG. 3 is a diagram showing the comparison of performance between the magnetic recording media provided according to the embodiment and the comparative example of the invention;

FIG. 10 is a table showing the measurement results of predetermined constituent elements of each sample;

FIG. 11 is a graph showing the relationship between the proportion of hydrogen on the surface of DLC and glide noise of each sample;

DESCRIPTION OF THE PREFERRED EMBODIMENTS

Figure 1:
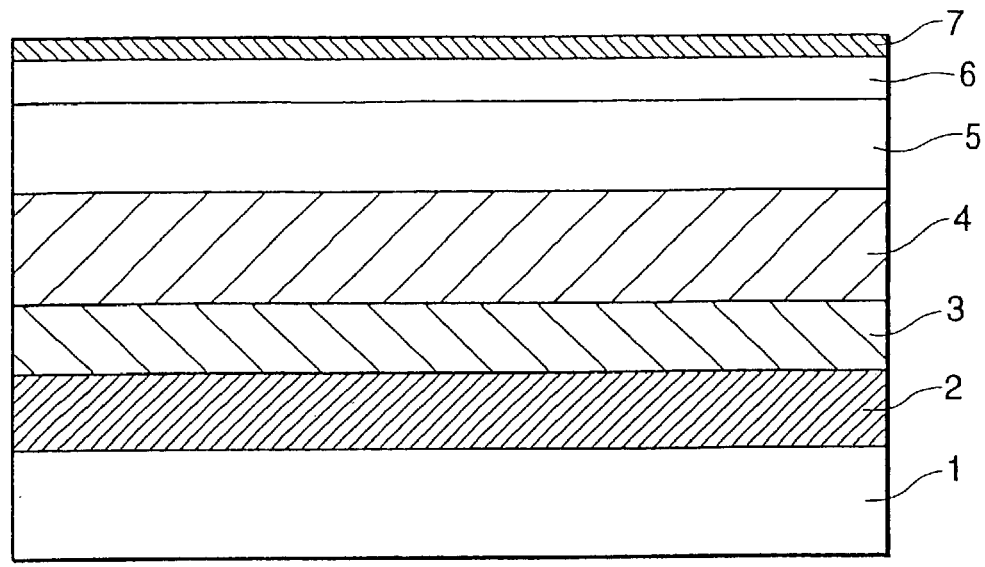
FIG. 1 is a typical sectional view of a magnetic recording medium according to the embodiment of the invention.

First, the function, constitution and operation of the invention will be described in brief in the following. In the manufacturing method for the magnetic recording medium having a magnetic layer, a protective layer mainly composed of carbon for protecting the magnetic layer and a lubricating layer of perfluoropolyether having at least one functional group provided on a substrate, at the time of forming the protective layer by an ion beam method using at least one of $N_2$, Ne, Ar, Kr, Xe and hydrocarbon gas, or only the hydrocarbon gas or a CVD method, the bonding performance between the protective layer and the lubricating layer is improved by adding at least one gas among $CO_2$, $NO_2$, $N_2O$.

In the magnetic recording medium provided by the above method, the proportion of functional groups per 100 carbon atoms in the protective layer can be over 20%.

Higher levels of the floating stability of a magnetic head and slide resistance can be obtained at the same time with the following constitution.

For example, this can be realized by a magnetic recording medium sequentially having a magnetic layer, a protective layer mainly composed of carbon for protecting the magnetic layer and a lubricating layer of a perfluoropolyether having at least one functional group on a substrate having a Cr-based alloy or other under layer formed thereon.

The protective layer mainly composed of carbon is a diamond-like carbon (DLC) layer in which the content of hydrogen in a portion from the surface to a depth of 1 nm is not higher than 30 at. % and lower than the content of hydrogen in a portion from the 1 nm surface layer to the magnetic layer side of the protective layer. The proportion of nitrogen atoms to carbon atoms in the DLC protective layer is 4% or more.

When the content of hydrogen in the surface layer and therearound of the DLC layer is made low, the factor of preventing the magnetic head from floating at a low level can be removed.

When a nitrogen atom is contained in the DLC layer as a functional group, the DLC layer has excellent bonding force with a lubricant thereon.

The magnetic storage apparatus of the invention includes the magnetic recording medium, a driving part for driving the magnetic recording medium, a magnetic head formed by a recording part and a reproducing part, a unit for moving the magnetic head relatively to the magnetic recording medium, a signal input unit for inputting a signal to the magnetic head and a recording reproducing signal processing unit for reproducing an output signal from the magnetic head, wherein the reproducing part of the magnetic head is formed by a magnetoresistive head, and the magnetic recording medium is formed by the magnetic recording medium including the protective layer having the above characteristic quality, hardness and thickness.

Further, the magnetoresistive sensor part of the magnetoresistive head is formed between two shield layers which are spaced from each other at a distance of 0.2 μm or less and made of soft magnetic substance, and the product Br×t of the thickness (t) of the magnetic layer of the thus constructed magnetic recording medium and the residual flux density Br measured by applying a magnetic field in the relative traveling direction of the magnetic head to the magnetic recording medium in recording ranges from 3.2 mA (40 gauss micron) to 9.6 mA (120 gauss micron) both inclusive.

The reason why the magnetoresistive sensor part of the magnetoresistive head is to be formed between two shield layers which are spaced from each other at a distance of 0.2 μm or less and made of soft magnetic substance is that in the magnetic storage apparatus having the maximum track recording density of 220 kFCI, sufficient reproducing output cannot be obtained. The distance between two shield layers made of soft magnetic substance is preferably 0.12 μm or more in view of working easiness.

The reason why the product Br×t of the thickness (t) of the magnetic layer of the thus constructed magnetic recording medium and the residual flux density Br measured by applying a magnetic field in the relative traveling direction of the magnetic head to the magnetic recording medium in recording ranges from 3.2 mA (40 gauss micron) to 9.6 mA (120 gauss micron) both inclusive is that when the Br×t is 3.2 mA (40 gauss micron), the risk of reproducing wrong information becomes higher due to lowering of reproducing output caused by being left for long time after recording, and when it exceeds 9.6 mA (120 gauss micron), it becomes difficult to overwrite in recording.

Further, by forming at least two layers of under layers in the magnetic recording medium, the crystal orientation of the magnetic layer may be controlled. By forming such multiple under layer, the influence of atomic diffusion from the under layer to the magnetic layer can be remarkably reduced, and simultaneously the crystallinity of the under layer close to the magnetic layer can be improved, and the adhesion between the magnetic layer and the under layer becomes strong so as to obtain high sliding resisting performance. Further, since the surface of the under layer close to the magnetic layer has no atomic periodic array extending over a long distance, the crystal grains of the magnetic layer formed thereon may be refined and also the crystal orientation may be controlled. Thus, the mean particle diameter of crystal constituting the magnetic layer is controlled to 15 nm or less suitable for reduction of noise, very fine size, and simultaneously the direction of the axis of easy magnetization may be controlled to be parallel to the layer surface suitable for in-plane magnetic recording.

The magnetoresistive head used in the magnetic storage apparatus of the invention is formed by a magnetoresistive sensor including plural conductive magnetic layers causing a large resistance change due to a relative change of mutual magnetizing directions by an external magnetic field, and a conductive non-magnetic layer disposed between the conductive magnetic layers. The reason why the thus constructed reproducing head is used is that a signal recorded at the maximum track recording density exceeding 300 kFCI is stably reproduced to obtain signal output.

Further, the magnetoresistive head is formed on a magnetic head slider, in which the area of the floating surface rail is equal to or smaller than 1.00 $mm^2$ and the mass is equal to or less than 2 mg to achieve the invention. The reason why the area of the floating surface rail is equal to or smaller than 1.00 $mm^2$ is that the probability of colliding with the projection is reduced, and simultaneously, the shock resistance reliability can be improved by setting the mass equal to or less than 2 mg. Thus, the recording density of 50 giga-bit per 1 $in^2$ and high shock resistance may be consistent with each other.

The embodiments of the invention will now be described in detail. FIG. 1 shows one embodiment of the invention.

<Embodiment 1>

First, a soda lime glass substrate 1 (outside diameter of 84 mm, inside diameter of 25 mm and thickness of 1.1 mm) to be used is sufficiently washed. This substrate is introduced into a vacuum vessel evacuated to about 5.3×10E (−5)Pa (4.0×10E (−7)Torr). First, it is transported to a first seed layer forming chamber to form a first seed layer 2 of Ni-25 at. % Cr-15 at. % Zr with a thickness of 20 nm under the condition of Ar atmosphere about 0.8 Pa (6 mTorr) by the DC magnetron sputtering method. Subsequently, it is transported to a second seed layer forming chamber to form a second seed layer 3 of Co-40 at. % Cr-5 at. % Zr with a thickness of 50 nm under the condition of Ar atmosphere about 0.8 Pa (6 mTorr) by the DC magnetron sputtering method. Subsequently, it is transported to a heating chamber in the vacuum layer to heat the substrate to the substrate temperature 260° C. by an infrared heater.

Subsequently, it is transported to an under layer forming chamber to form an alloy under layer 4 of Cr-10 at. % Mo-7.5 at. % Ti with a thickness of 30 nm under the condition of Ar atmosphere about 0.8 Pa (6 mTorr) by the DC magnetron sputtering method. Subsequently, it is transported to a magnetic recording layer forming chamber to form an alloy layer 5 (to form a magnetic layer) of Co-20 at. % Cr-4 at. % Ta-8 at. % Pt with a thickness of 22 nm under the condition of Ar atmosphere about 0.9 Pa (7 mTorr) by DC magnetron sputtering method. By using the substrate where the alloy under layer 4 of Cr-10 at. % Mo-7.5 at. % Ti and the alloy layer 5 of Co-20 at. % Cr-4 at. % Ta-8 at. % Pt are formed, the protective layer which is mentioned later and mainly composed of carbon according to the invention is formed.

As the substrate 1, in addition to the soda lime glass, used is a non-magnetic rigid substrate formed of chemical reinforced aluminosilicate, an Al—Mg alloy electroless-plated with Ni—P, silicon, ceramics made of borosilicate glass or the like, or ceramics subjected to glass glazing or the like.

As the first and second seed layers are provided for avoiding electrochemical precipitation of alkali metal from the soda lime glass, they may have an arbitrary thickness, and one layer will do. Further, if not needed, it may be omitted. The under layer 4 is used as a under layer for controlling the crystal orientation of a magnetic layer formed thereon. As the under layer, used is a thin layer of a Cr-group alloy such as non-magnetic Cr—V, Cr—Ti, Cr—Mo, Cr—Si, Cr—Mo—Ti alloy forming an irregular solid solution which has good crystal consistency with the magnetic layer and may be (100) orientated. When simultaneously 0.5 vol. % to 50 vol. % nitrogen is added to the gas for discharge used in sputtering to form the under layer, the crystal grains of the under layer are refined. As a result, the crystal grains of the continuously formed magnetic layer are also refined so that medium noise can be reduced.

As the magnetic layer 5, not only Co—Cr—Pt—Ta alloy, but a multi-alloy family material in which Co is taken as principal component, Pt is contained to increase the coercive force, and further Cr, Ta, $SiO_2$, Nb and the like to reduce medium noise are added may be used. Especially, when Ta, Nb, V, and Ti are added, the melting point of a target is lowered, and composition separation of the magnetic layer containing Cr is easy to progress. This is favorable.

In the Co-group alloy family material to which Pt, Ni or Mn is added, lowering of magnetic anisotropic energy is less than that in the case of other additive elements, so it is practical. To be concrete, in addition to Co—Cr—Pt, used are alloys such as C—Cr—Pt—Ta, Co—Cr—Pt—$SiO_2$, Co—Cr—Pt—Mn, Co—Cr—Nb—Pt, Co—Cr—V—Pt, Co—Cr—Ti—Pt, Co—Cr—Nb—Ta—Pt, Co—Pt—Ni—$SiO_2$ and the like.

Concerning the composition of a Co alloy layer occupying a ferromagnetic portion, it is considered that the solid solution limit of Cr is 5 to 10 at. %, and the solid solution limit of Ta is about 2 at. %, and a Co alloy magnetic layer is formed exceeding these solid solution limits, whereby the magnetic separation in the magnetic layer progresses to reduce medium noise. As a practical composition, for example, the followings are used:

Co-20 at. % Cr-4 at. % Ta-8 at. % Pt alloy;
Co-22 at. % Cr-20 at. % Pt alloy;
Co-15 at. % Cr-8 at. % Pt-20 mol. % $SiO_2$ alloy;
Co-17 at. % Cr-12 at. % Pt-5 at. % Mn alloy;
Co-17 at. % Cr-5 at. % Nb-10 at. % Pt alloy;
Co-20 at. % Cr-5 at. % V-12 at. % Pt alloy;
Co-20 at. % Cr-10 at. % -15 at. % Pt alloy;
Co-15 at. % Cr-5 at. % Nb-5 at. % Ta-20 at. % Pt alloy.

Figure 2:
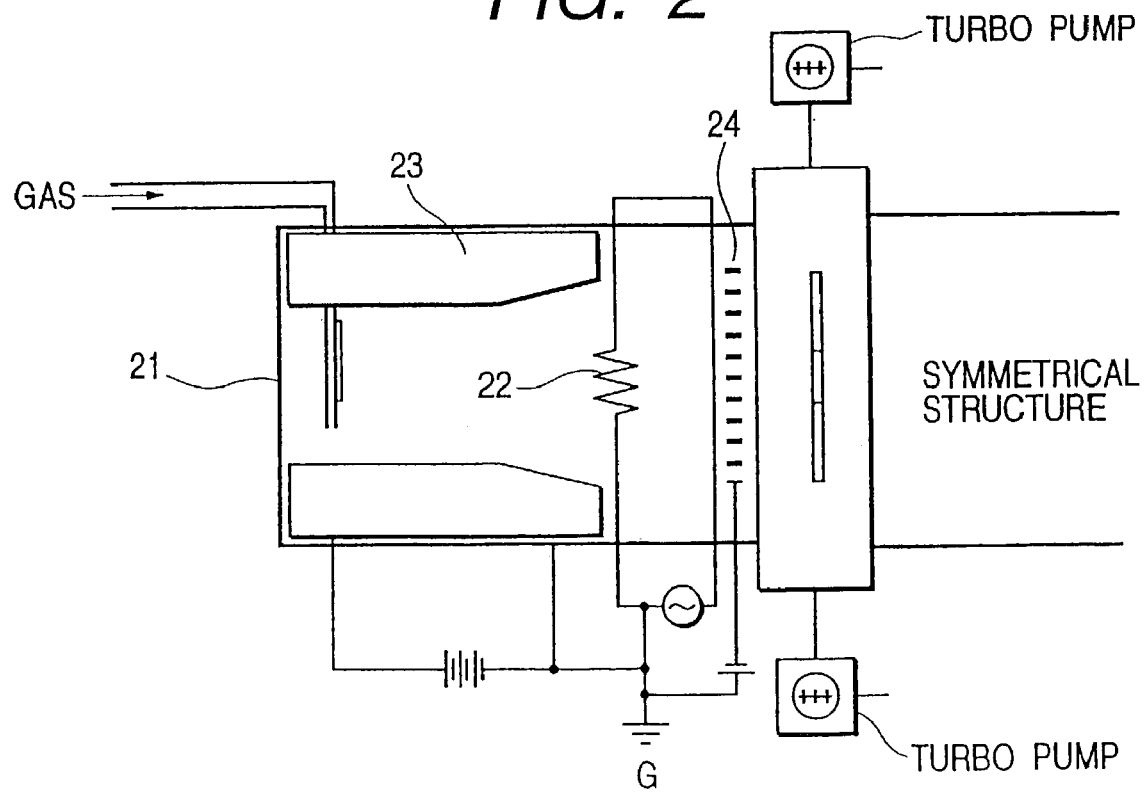
FIG. 2 is a schematic diagram of a protective layer forming chamber 21.

The above substrate is transported without being taken out from the vacuum vessel to a protective layer forming chamber 21 shown in FIG. 2. The protective layer forming chamber 21 is formed by an ion gun including a heat filament 22, an anode 23 and a grid 24 disposed in front of the heat filament. While the protective layer forming chamber 21 is evacuated by a turbo-molecular pump, from the rear of the anode, 15 sccm (Standard Cubic centimeter per minutes) of Ar gas, 50 sccm of ethylene ($C_2H_4$) gas, further 20 sccm of carbon dioxide ($CO_2$) gas, 10 sccm of nitrogen dioxide ($NO_2$) gas and 10 sccm of laughing gas ($N_2O$) are introduced through a mass flow controller. At this time, the pressure is about 0.5 Pa(4 mTorr) at the baratron gauge.

Subsequently, 30A is applied to the heat filament of the ion guns positioned on both sides of the substrate, DC +100V is applied to the anode to induce plasma, and then −530V is applied to the grid to derive ions. Further, pulse bias with −100V and 3 kHz is applied to the substrate. At this time, the anode current is 500 mA, and the bias current of the substrate is 50 mA. By this ion beam deposition method (IBD), a DLC protective layer 6 mainly composed of carbon and hydrogen is formed 3 nm thick on the Co—Cr—Ta—Pt alloy layer 5. The deposition rate of layer at this time is 1.0 nm/s.

By the above method, plural discs are manufactured, some of them are subjected to thin layer analysis, and the other are provided with a lubricant layer 7 of fluorocarbon family. The thickness of the layer is 2.2 nm measured by quantitative analysis using Fourier-Transform InfraRed spectroscopic analyzer (FT-IR). After that, floating check is performed to make a sliding test in a single plate, or the disc is built in the magnetic disc apparatus to make a reliability test.

The protective layer of the disc manufactured by the above method is analyzed by the following methods to measure the proportion of functional groups of the protective layer surface. That is, ESCA (Electron Spectroscopy for Chemical Analysis) is used for identifying the covering rate of the functional groups of the protective layer surface. Direct identification of —COOH, —C=O, —COH, —$CNH_2$ which are surface functional groups, using ESCA is difficult in view of sensitivity and measurement accuracy. The above problems have been overcome by the tag modification method described in the following.

That is, the covering rate identification is performed by modification (tag modification) using molecules which have functional groups interacting with the protective layer surface functional groups quantitatively and irreversibly by molecular recognition, and contain fluorine atoms which have high sensitivity coefficient to ESCA.

To be concrete,

To identify —COOH functional group, the protective coat surface is dipped in a benzene solution of pentafluorophenyl bromide for one hour to modify —COOH functional group with fluorine molecules.

To identify —C=O functional group, the protective layer surface is dipped in an ethanol solution of pentafluorophenylhydrazine for one hour to modify —C=O functional group with fluorine molecules.

To identify —COH functional group, the protective layer surface is dipped in an ethanol solution of perfluorooctyldimethylchlorosilane to modify —COH functional group with fluorine molecules.

To identify —$CNH_2$ functional group, the protective layer surface is dipped in a chloroform solution of pentafluorobenzoylchloride for one hour to modify —$CNH_2$ functional group with fluorine molecules.

The respective protective layer surface tag-modified by one hour reaction at room temperature are dipped in the respective solvents to remove unreacted material from the protective layer surface.

In identifying the functional group covering rate of the protective layer surface, each tag-modified protective layer surface is obtained at an angle 24° of analysis of ESCA by Cls and Fls measurement intensity ratio, and as a result, the proportion of the functional groups —COOH, —C=O, —COH, —$CNH_2$ per 100 carbon atoms is about 30% on the average in total.

On the other hand, the disc provided with a lubricant is attached on an evaluating apparatus having a head load/unload mechanism to make a test. When load/unload test on ten discs are made 50000 times at a rotating speed of 15000 r.p.m, tests on all of ten discs are ended without crash. Further, when the thickness of the lubricating layer of the tested disc is measured by FT-IR, it is confirmed that the thickness is hardly decreased, 2.1 nm. As a result, it is proved that the magnetic recording medium of the invention has reinforced bonding force to the lubricant so that a decrease in lubricant due to spin-off is small, and even in the case where the thickness of the protective layer is very thin, 3 nm, sliding resisting reliability is sufficient. The above evaluation result is described as sample No. 1 in FIG. 3.

COMPARATIVE EXAMPLE

Sample No. 2 is manufactured by the substantially same method as that of the embodiment 1 except that 10 sccm of carbon dioxide ($CO_2$) gas and nitrogen oxide ($NO_2$) gas and dinitrogen monoxide are not added at the time of forming the protective layer 6. The thickness of the protective layer 6 is 3 nm which is the same as that of the embodiment 1, and similarly the thickness of the lubricating layer 7 is 2.2 nm. The thus manufactured disc is evaluated by the same method as that of the embodiment 1.

As a result, in the tag modification analysis, the proportion of the surface functional group is 13%. When load/unload test is made on ten discs at the rotating speed of 15000 r.p.m, all of the discs cause crash during the time from 1000 times to 8000 times. When the thickness of the lubricating layer is measured on ten discs by FT-IR, it is confirmed that the thickness is decreased to 0.7 to 1.2 nm as compared with that before the test.

As a result, it is known that in the magnetic recording medium obtained by the manufacturing method of the comparative example, the bonding force between the protective layer and the lubricating layer is not enough so that the lubricating layer is scattered and decreased due to high speed rotation, and the frictional force between the magnetic recording medium and the magnetic head is increased to cause crash.

<Embodiment 2>

When 5,0000 times load/unload tests are executed on the disc described in the embodiment 1, in all of the magnetic recording medium taking the thickness of the magnetic layer to be 15 nm, 17 nm and 21 nm, the magnetic recording media and the magnetic head are not broken down, so favorable sliding resistance reliability is obtained.

By decreasing the thickness of the magnetic layer, the product Br×t of the thickness (t) of the magnetic layer and the residual magnetic flux density Br is largely decreased. The in-plane coercive force Hc approximately ranges from 176 kA/m to 256 kA/m, the coercivity squareness S* is from 0.74 to 0.65, about 0.7, and the remanence squareness is 0.78 to 0.7 (the remanence squareness S is the ratio of the residual flux density to the saturated flux density). These magnetic characteristics are measured at 25 (C by a sample vibration type magnetometer.

The electromagnetic transducing characteristics of these magnetic recording medium are measured by using a magnetic head constructed so that the shield gap length Gs of the magnetoresistive reproducing element (MR element) is 0.12 μm and the gap length of the write element is 0.2 μm. The sense current of the MR element is set to 3 mA, and the write current I is set to 41 mA. The floating height of the head is varied by changing the rotating seed of the magnetic recording medium (magnetic disc medium) to measure the output half width PW 50 of a solitary reproduced wave by a digital oscilloscope (Tektronix TDS 544).

The thinner the magnetic layer is, and the lower the floating height of the magnetic head is, the smaller the PW 50 is. In the case where the thickness of the magnetic layer is 15 nm and the floating height of the head is 25 nm, a small value, 240 nm is obtained. The output at the maximum track recording density of 360 kFCI measured by the spectral analyzer is 1 to 2% of the output of a solitary reproduced wave at 10 kFCI measured by the digital oscilloscope. The output at the maximum track recording density of 360 kFCI measured by the spectral analyzer is integrated and obtained until it exceeds the output of waveform of the odd order by 100 MHz.

Further, the ratio SLF/Nd of the integrated medium noise (Nd) in the case where 0-p output (SLF) of the solitary reproduced wave and a signal of 360 kFCI are recorded is evaluated. The floating height of the head is taken as 25 nm, and Nd is taken as the integrated value of noise of a band corresponding to from 0.5 kFCI to 540 kFCI. In all of media, a high SLF/Nd ratio above 24 dB is obtained at the high recording density as much as 360 kFCI.

Figure 4:
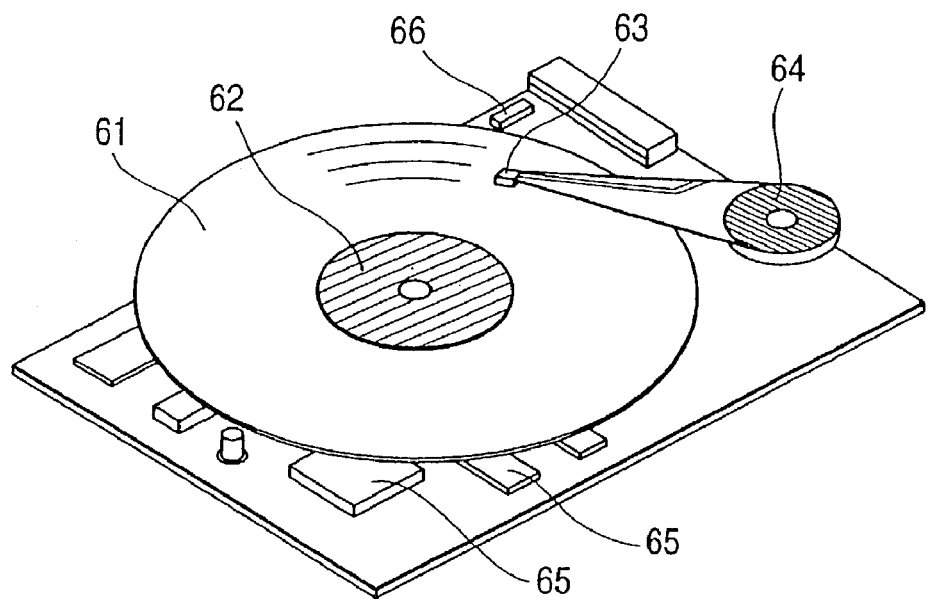
FIG. 4 is a diagram showing the general construction of a magnetic storage device.

FIG. 4 shows the constitution of the magnetic storage apparatus including the magnetic disc medium 61, a driving part 62 for driving the magnetic recording medium, a magnetic head 63 formed by a recording part and a reproducing part, a unit 64 for moving the magnetic head relatively to the magnetic recording medium, a signal input unit for inputting a signal to the magnetic head, a recording reproducing signal processing unit 65 for reproducing an output signal from the magnetic head, and a part 66 serving as a refuge place at the time of loading and unloading the magnetic head.

Figure 5:
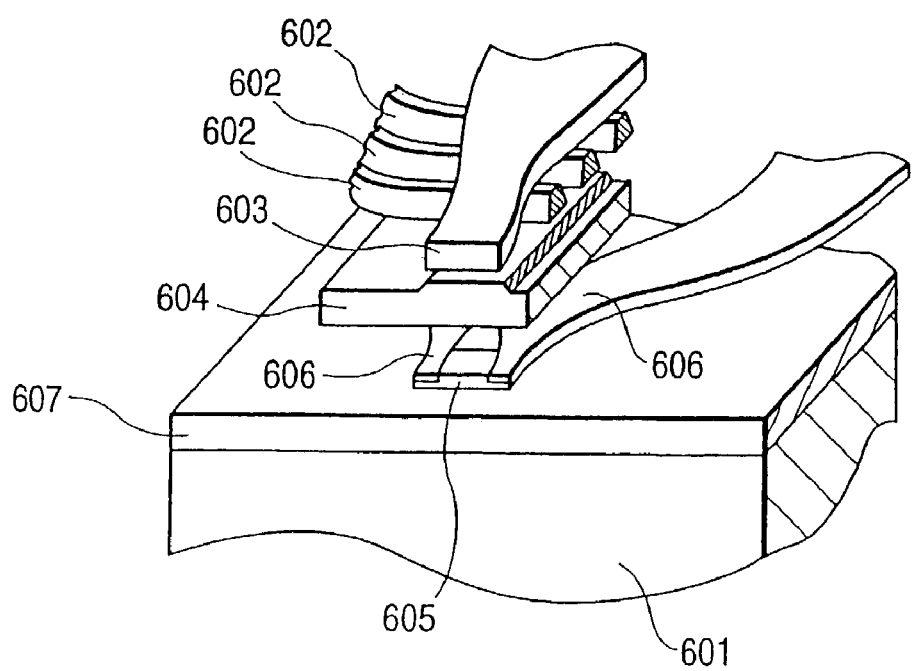
FIG. 5 is a typical perspective view of a magnetic head.
Figure 6:
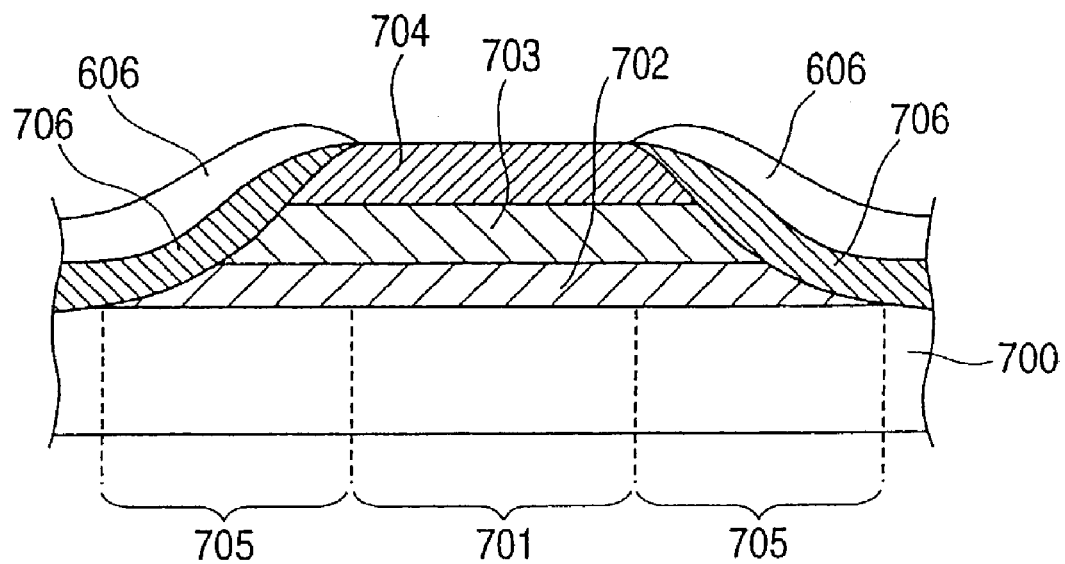
FIG. 6 is a diagram showing the sectional structure of a magnetoresistive sensor.

The reproducing part of the magnetic head is formed by a magnetoresistive head. FIG. 5 is a typical perspective view of the magnetic head used in measurement. The head is a composite head having both an electromagnetic induction type head for recording and a magnetoresistive head which are formed on a substrate 601. The recording head is formed by an upper recording magnetic pole 603 and a combined lower recording magnetic pole and upper shield layer 604 which sandwich coils 602, and the gap length between the recording magnetic poles is 0.3 µm. For the coil, copper 3 µm thick is used. The reproducing head is formed by a magnetoresistive sensor 605 and electrode patterns 606 at both ends thereof, the magnetoresistive sensor is sandwiched by the combined lower recording magnetic pole and upper shield layer 604 and a lower shield layer 607 which are 1 µm thick, and the distance between the shield layers is 0.20 µm. In FIG. 6, the gap layer between the recording magnetic pole, and the gap layer 608 between the shield layer and the magnetoresistive sensor 608 are omitted.

FIG. 6 shows the structure of the section of the magnetoresistive sensor. The signal detection area 701 of the magnetic sensor is formed by a portion where a lateral bias layer 702, a separation layer 703 and a magnetoresistive ferromagnetic layer 704 are sequentially formed on a gap layer 700 of aluminum oxide. Ni—Fe alloy 20 nm thick is used in the magnetoresistive ferromagnetic layer 704. Though Ni—Fe—Nb alloy 25 nm thick is used in the lateral bias layer 702, any ferromagnetic alloy such as Ni—Fe—Rh and the like may be used if the electric resistance is comparatively high and soft magnetic characteristic is favorable.

The lateral bias layer 702 is magnetized by a magnetic field formed by a sense current flowing through the magnetoresistive ferromagnetic layer 704 in the layer in-plane direction (lateral direction) vertical to the current, and lateral bias magnetic field is applied to the magnetoresistive ferromagnetic layer 704. Thus, selected is a magnetic sensor showing the linear reproduction output to the leakage magnetic field from the medium 61. In the separation layer 703 for preventing effective shunt current of sense current from the magnetoresistive ferromagnetic layer 704, Ta having comparatively high electric resistance is used, and the layer thickness is taken as 5 nm.

Both ends of the signal detection area are provided with a taper part 705 worked to be tapered. The taper part 705 is formed by a permanent magnet layer 706 for making the magnetoresistive ferromagnetic layer 704 into single magnetic domain, and a pair of electrodes 606 formed thereon for taking a signal. It is necessary that the permanent magnet layer 706 has large coercive force and the magnetizing direction is not easily changed, and an alloy such as Co—Cr, Co—Cr—Pt or the like is used.

The magnetic storage apparatus shown in FIG. 4 is formed by combining the magnetic recording medium described in the embodiment 1 with the head shown in FIG. 5. As a result, in the floating system in which the magnetic floating height hm is about 48 to 60 nm, when the product Br×t of the thickness (t) of the magnetic layer and the residual flux density Br measured by applying a magnetic field in the relative running direction of the magnetic head to the magnetic recording medium in recording exceeds 9.6 mA (120 gauss micron), satisfactory writing cannot be performed, the overwrite characteristic is deteriorated, and the output especially in the high track recording density area is also lowered.

On the other hand, when Br×t is smaller than 32 mA (40 gauss micron), in some case, it is found that being left at 70° C. for four days, the reproduction output is decreased in some composition or thickness of the recording layer of the medium. Accordingly, the magnetic storage apparatus is constructed so that the product Br×t of the thickness (t) of the magnetic layer and the residual magnetic flux density Br measured by applying a magnetic field in the relative running direction of the magnetic head to the magnetic recording medium in recording mentioned in the magnetic recording medium described in the embodiment 1 ranges from 3.2 mA (40 gauss micron) to 9.6 mA (120 gauss micron) both inclusive.

In the case where the magnetoresistive sensor part of the magnetoresistive head uses a head formed between two shield layers which are spaced from each other at a distance of 0.2 µm and made of soft magnetic substance, when the maximum track recording density exceeds 250 kFCI, sufficient reproduction output cannot be obtained. When the distance between two shield layers made of soft magnetic substance is below 0.12 µm, the element cannot be formed easily because of difficulty in process machining. Accordingly, the magnetic storage device is formed by using a head formed between two shield layers which are spaced from each other at a distance ranging from 0.12 µm to 0.2 µm both inclusive and made of soft magnetic substance. By the thus constructed magnetic storage apparatus, the recording density equal to or higher than 50 giga bit per 1 $in^2$ can be realized.

<Embodiment 3>

A magnetic storage apparatus is formed by the same constitution as that of FIG. 4 except that instead of the magnetoresistive head used in the embodiment 2, the magnetoresistive head 63 described in the embodiment 2 uses a magnetic head formed by a magnetoresistive sensor including plural conductive magnetic layers which cause a large resistance change due to a relative change in mutual magnetizing directions by an external magnetic field and a conductive non-magnetic layer disposed between the conductive magnetic layers.

Figure 7:
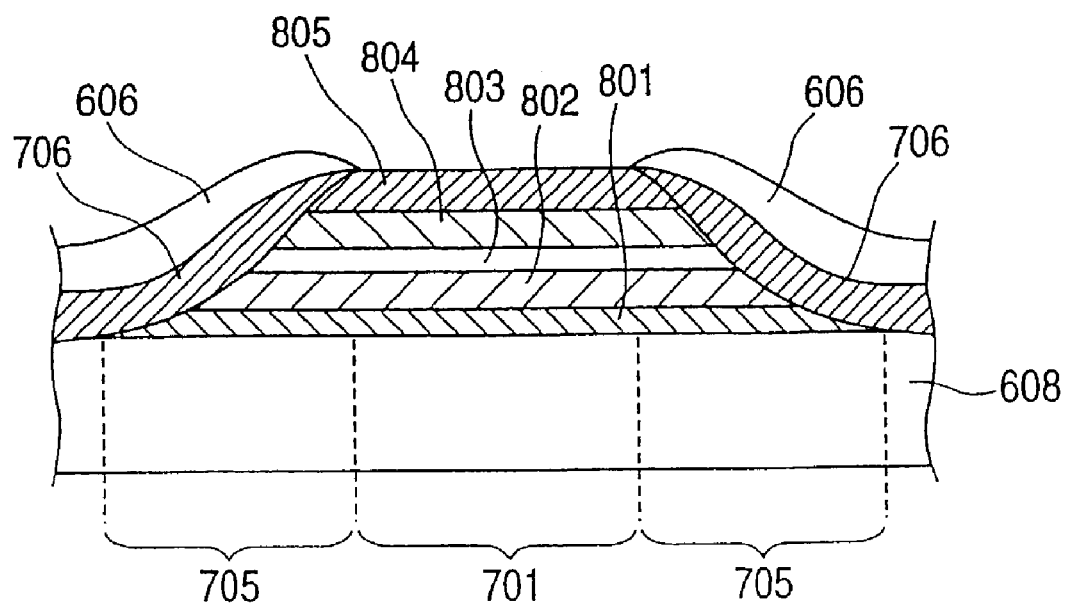
FIG. 7 is a sectional view of a sensor using a spin valve head.

FIG. 7 shows the sectional view of the used sensor. The sensor has a structure in which a Ta buffer layer 801 5 nm thick, a first magnetic layer 802 with a thickness of 7 nm, an intermediate layer 803 made of copper 1.5 nm thick, a second magnetic layer 804 3 nm thick, and a Fe-50 at. % Mn antiferromagnetic alloy layer 805 10 nm thick are sequentially formed on a gap layer 608. In the first magnetic layer 802, Ni-20 at. % Fe alloy is used, and in the second magnetic layer 804, cobalt is used.

By exchange magnetic field from the antiferromagnetic layer 805, the magnetization of the second magnetic layer 804 is fixed in one direction. On the contrary, the direction of the first magnetic layer 802 which is in contact with the second magnetic layer 804 by intercalating the non-magnetic layer 803 is varied by the leakage magnetic field from the magnetic recording medium 61 so that the resistance change is caused.

Such resistance change caused by a change in the relative direction of magnetization of two magnetic layers is called spin valve effect. In the present embodiment, a spin valve head utilizing the effect for the reproducing head is used. The taper part 705 has the same constitution as that of the magnetic sensor of the embodiment 2.

The Br×t of the magnetic recording medium used in measurement is taken as 3, 3.2, 4, 6, 8, 10, 12, and 14 mA. In the case where Br×t is taken as 3 mA (37.5 gauss micron), lowering of a reproducing signal caused with the passage of time is extreme, and it is difficult to obtain practically favorable coercive force. When Br×t exceeds 12 mA (150 gauss micron), though the output of 2F is large, the tendency of lowering the output resolution becomes remarkable so that it is not favorable.

When such a spin valve reproducing head is used, as described in the embodiment 2, a signal recorded at the maximum track recording density exceeding 360 kFCI is stably reproduced to obtain signal output.

The head shown in here is the same as the head used in the embodiment 2, and the magnetoresistive head is formed on the magnetic head slider constructed so that the area of the floating surface rail is equal to or smaller than 1.4 mm$^2$ and the mass is equal to or less than 2 mg. Setting the area of the floating surface rail equal to or smaller than 1.4 mm$^2$ reduces the probability of colliding with the projection, and simultaneously setting the mass equal to or less than 2 mg can improve shock resistance reliability. Thus, high recording density and high shock resistance can be reconciled, and the average failure time interval (MTBF) equal to or longer than 30,0000 hours at the recording density equal to or higher than 50 giga bit per 1 in$^2$ can be realized.

A magnetic recording medium capable of improving the flyability of a magnetic head and having excellent flyability and slide reliability of a head can be obtained with the following constitution. The magnetic recording medium of the invention is manufactured by sequentially forming a magnetic layer, a protective layer mainly composed of carbon for protecting the magnetic layer and a lubricating layer of a perfluoropolyether having at least one functional group on a substrate having a Cr-based alloy or other under layer formed thereon.

The protective layer mainly composed of carbon is a diamond-like carbon (DLC) layer in which the content of hydrogen in a portion from the surface to a depth of 1 nm is not larger than 30 at. % and lower than the content of hydrogen in a portion from the 1 nm surface layer to the magnetic layer side of the protective layer. The proportion of nitrogen atoms to carbon atoms in the DLC protective layer is 4% or more.

When the content of hydrogen in the surface layer and therearound of the DLC layer is made low, the factor of preventing the magnetic head from floating at a low level could be removed.

When a nitrogen atom is contained in the DLC layer as a functional group, the DLC layer has excellent bonding force with a lubricant thereon.

An embodiment of the invention will be described in detail with reference to the drawings.

(Embodiment 4)

Figure 8:
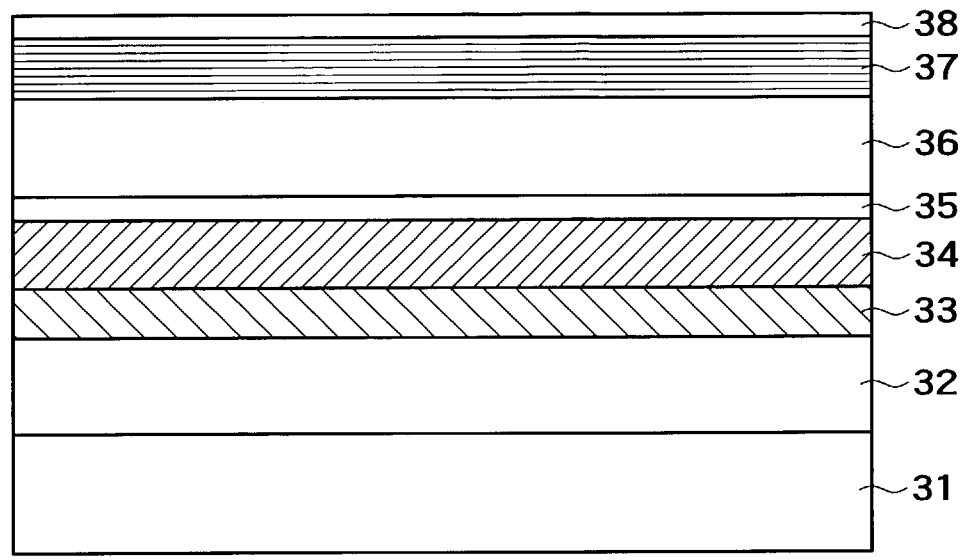
FIG. 8 is a sectional view of a magnetic recording medium according to the present invention.

FIG. 8 is a sectional view of a magnetic recording medium according to the invention. Reference numeral 31 denotes a non-magnetic substrate, 32 a NiTa seed layer, 33 a Cr alloy under layer, 34 a Co alloy underlying magnetic layer, 35 a Ru antiferromagnetic bond induction layer, 36 a Co alloy upper magnetic layer, 37 a DLC protective layer (to be referred to as "DLC protective layer" hereinafter) and 38 a lubricating layer.

Figure 9:
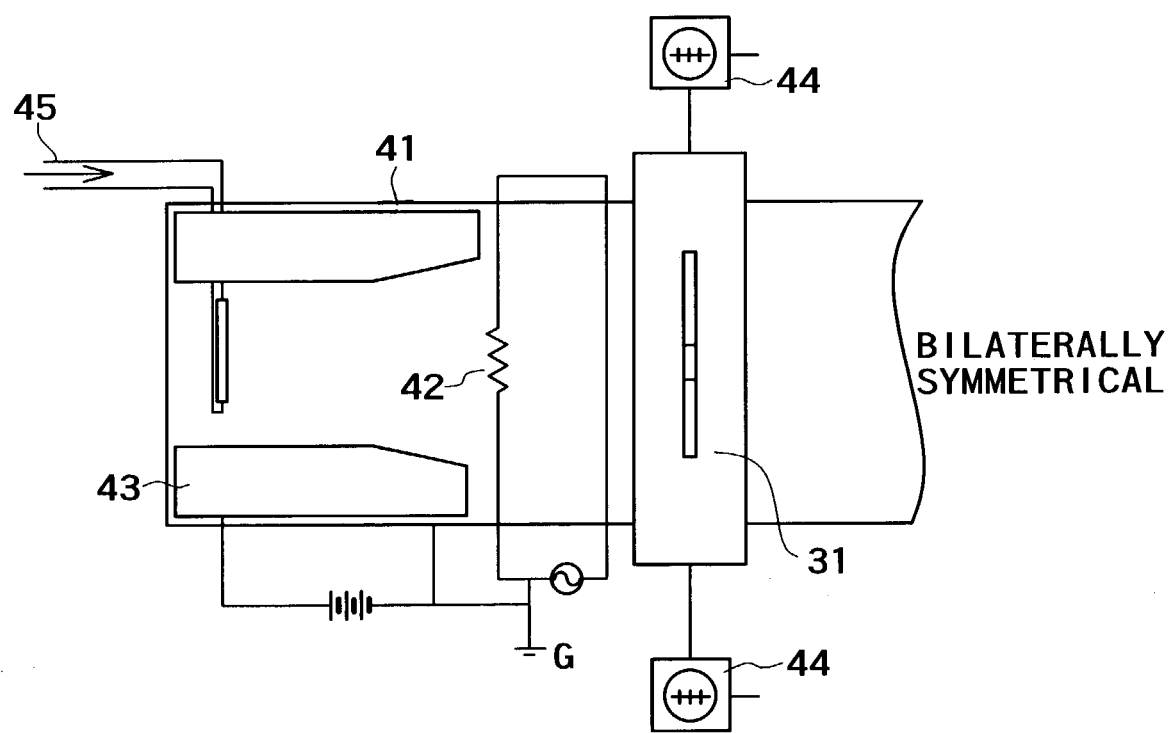
FIG. 9 is a schematic diagram of a layer forming apparatus for forming a DLC protective layer on a magnetic recording medium.

FIG. 9 is a schematic diagram of a layer forming apparatus for forming the DLC protective layer on the magnetic recording medium. Since the step of forming a magnetic layer and other layers on the non-magnetic substrate 31 is carried out by the following general manufacturing method, the drawing of the manufacturing apparatus is omitted.

(Layer Formation Before the Formation of Protective Layer)

First, a soda lime glass substrate 31 (outside diameter of 84 mm, inside diameter of 25 mm, thickness of 1.27 mm) to be used was fully cleaned. This substrate was introduced into a vacuum vessel evacuated to about 1.3×10E-5 Pa (1.0×1.0E-7 Torr). This substrate was first transported to a seed layer forming chamber to form an Ni-37.5 at % Ta seed layer 32 having a thickness of 25 nm by the DC magnetron sputtering method under an Ar atmosphere at about 0.8 Pa (6 mTorr). Subsequently, it was transported to a heating chamber in the vacuum tank to increase the temperature of the substrate to 280° C. with an IR heater (infrared heater).

Thereafter, the substrate was transported to an under layer forming chamber to form a Cr-15 at % Ti-4 at % B alloy under layer 33 having a thickness of 10 nm by the DC magnetron sputtering method under an Ar atmosphere at about bout 0.8 Pa (6 mTorr). Subsequently, it was transported to a first magnetic layer forming chamber to form a Co-15 at % Cr-5 at % Pt alloy layer 34 having a thickness of 5 nm by the DC magnetron sputtering method under an Ar atmosphere at about 0.9 Pa (7 mTorr).

Subsequently, it was transported to an antiferromagnetic bond induction layer forming chamber to form a Ru layer 35 having a thickness of 0.5 nm by the DC magnetron sputtering method under an Ar atmosphere at about 0.8 Pa (6 mTorr). Further, it was transported to a magnetic recording layer forming chamber to form a Co-20 at % Cr-14 at % Pt-5 at % B alloy magnetic recording layer 36 having a thickness of 20 nm by the DC magnetron sputtering method under an Ar atmosphere at about 0.9 Pa (7 mTorr).

As the substrate 31 may be used a substrate made from chemically reinforced aluminosilicate, Al—Mg alloy electrolessly plated with Ni—P, silicon, ceramic having borosilicate glass, ceramic subjected to glass grazing or other non-magnetic rigid material, in addition to the soda lime glass substrate.

The seed layer 32 is formed to prevent the electrochemical precipitation of an alkali metal from the soda lime glass. The seed layer 32 may have any thickness and may be omitted when it is not necessary from its relationship with the substrate 31.

The under layer 33 is used as an under layer for controlling the crystal alignment of the magnetic layer 34 formed thereon. The under layer 33 may be a thin layer of non-magnetic Cr—V, Cr—Ti, Cr—Mo, Cr—Si, Cr—Mo—Ti alloy or other Cr-group alloy which has good crystal consistency with the magnetic layer, can be aligned to (100) and forms an irregular solid solution. When the under layer 33 is formed by adding 0.5 vol % to 50 vol % of nitrogen to a discharge gas used for sputtering simultaneously, the crystal grains of the under layer become finer. As a result, the crystal grains of the magnetic layer 34 formed continuous to the under layer become finer, thereby reducing medium noise.

The magnetic layer 34 and the magnetic layer 36 may be a magnetic layer of not only the above alloy but also a multi-element alloy which contains Co as the main component, Pt for increasing coercive force and Cr, Ta, SiO$_2$, Nb and other additive elements for reducing medium noise. Particularly when Ta, Nb, V and Ti are added, the melting point of the target lowers and the composition separation of the magnetic layer containing Cr readily proceeds advantageously.

A Co-group alloy-based magnetic layer containing Pt, Ni or Mn is practical because a reduction in magnetic anisotropic energy is smaller than other additive elements. More specifically, Co—Cr—Pt—Ta, Co—Cr—Pt—SiO$_2$, Co—Cr—Pt—Mn, Co—Cr—Nb—Pt, Co—Cr—V—Pt, Co—Cr—Ti—Pt, Co—Cr—Nb—Ta—Pt, Co—Pt—Ni—SiO2 or other alloy may be used in addition to Co—Cr—Pt—B.

As for the composition of the Co alloy layer which is used in a ferromagnetic portion, the solid-solution limit of Cr is considered to be 5 to 10 at %, and the solid-solution limit of Ta is considered to be about 2 at %. A Co alloy magnetic layer is formed by adding Cr and Ta to exceed these solid-solution limits, whereby the magnetic separation of the magnetic layer is promoted to reduce medium noise.

It could be confirmed that the Ru layer used as the antiferromagnetic bond induction layer can antiferromagnetically bond the first magnetic layer 34 to the magnetic recording layer 36 when it has a thickness of 0.2 to 0.6 nm.

A DLC protective layer 37 mainly composed of carbon which will be described hereinbelow was formed by using the substrate having the above magnetic recording layer 36.

(Formation of Protective Layer)

The substrate 31 having the magnetic layer 36 formed thereon was transported to a protective layer forming chamber 41 shown in FIG. 9 without being taken out from the vacuum tank. In this protective layer forming chamber 41, an ion gun having a heat filament 42 and an anode 43 is arranged on both sides of the substrate 31 symmetrically and a layer can be formed on both sides of the substrate 31 at the same time.

While the protective layer forming chamber 41 was evacuated by a turbo-molecular pump 44, a nitrous oxide gas ($N_2O$) was introduced from a gas introduction port 45 formed behind the anode 43 at a rate of 12 sccm (Standard Cubic Centimetric per Minute) for 3.8 seconds. At the same time, an ethylene ($C_2H_4$) gas was introduced at 40 sccm for 1 second, at 35 sccm for 1.7 seconds, at 30 sccm for 2.4 seconds, at 25 sccm for 3.1 seconds and at 20 sccm for 3.8 seconds stepwise through a mass flow controller and stopped.

DC 30 A was applied to the heat filaments of the ion guns arranged on both sides of the substrate at this point.

0.3 seconds after the introduction of the gas, DC +70 V was applied to the anodes 43 to induce plasma. Further, an unshown electrode which was made from an aluminum alloy and whose potential was insulated from the ground and the anodes 43 was contacted to the end surface of the substrate 1 to apply a bias voltage of −140 V to the substrate. The application of this anode voltage and bias voltage was carried out for 3.5 seconds until the supply of the gas was stopped after the induction of plasma. The current of the anode was 1.2 A and the bias current of the substrate was 80 mA. An emission current from the filament was calculated to be 0.5 A. A DLC protective layer 37 containing carbon as the main component and hydrogen and nitrogen was formed on the Co—Cr—Pt—B alloy magnetic layer 36 by the ion beam deposition (IBD) method to a thickness of 3.5 nm. This deposition rate of the DLC layer was 1.0 nm/s.

Sample No. 3 was prepared by the above method.

(Measurement of Sample)

The proportion of hydrogen atoms to carbon atoms and the proportion of nitrogen atoms to carbon atoms in the interior and surface of the DLC protective layer of sample No. 3 were measured. The measurement method and results are given below.

HFS (Hydrogen Forward Scattering) was used for the determination of the content of hydrogen. The measuring instrument was the HRBS500 high-resolution RBS analyzer of Kobe Steel Ltd., the beam energy was 480 KeV, the type of ions was N2+, the diffusion angle was 30°, the beam incident angle was 70° from the normal of the sample, the sample current was about 1.5 nA, the dose of beam was about 310 nC, and the measurement energy was 60 to 95 KeV. Hydrogen ions recoiled by nitrogen ions under the above measurement conditions were detected by a magnetic field detector. An already known sample which did not contain hydrogen was used as a background.

As a result, the proportion of hydrogen atoms on the surface of DLC of sample No. 3 was 25% and the proportion of hydrogen atoms in the interior of DLC was 37%.

XPS (X-ray Photoelectron Spectroscopy) was used for the determination of the content of nitrogen. The ESCA analyzer of ULVAC-PHI, INC. was used as a measurement instrument, AlKα1 was used as an excitation source, the beam diameter was 200 μm, and the take-out angle was 24°.

As a result, the proportion of nitrogen atoms contained in the DLC layer of sample No. 3 was 4.8%.

A fluorocarbon-based lubricant layer 38 was formed on the DLC protective layer 37 using a plurality of disks other than sample No. 3 by a known method. When the thickness of the lubricant layer 38 was measured by a Fourier-transform infrared spectroscopy (FT-IR), it was 1.7 nm. Further, one of them was rinsed in a fluorinate solvent to remove a layer (non-fixed layer) not fixed to the surface of the DLC protective layer 37 out of lubricant layer 38 adhered to the DLC protective layer 37, and then the thickness of the lubricant layer 38 chemically bonded to the DLC protective layer 37 was determined by FT-IR again. The thickness of the lubricant layer 38 was 1.1 nm (fixed layer) and it could be confirmed that about 65% of the lubricant layer 38 was fixed to the DLC protective layer 37.

The floating stability and reliability of a head shown below were evaluated using another disk having a fluorocarbon-based lubricant layer 38 formed thereon.

As for the evaluation of the floating stability of a magnetic recording medium, glide noise from a head (glide head) having a piezoelectric element mounted thereon was measured. Three disks were used for this evaluation.

"Glide noise" means noise generated from the piezoelectric element while the glide head floats above the magnetic recording medium. When the glide noise is large, a slider does not float above the magnetic recording medium stably. The method of measuring glide noise is given below.

The glide head was floated above a revolving magnetic recording medium and moved from a radial position on the magnetic recording medium of 16.5 mm to 41.5 mm in increments of 0.05 mm. At each radial position, the noise of the piezoelectric element was measured for one round trip of the magnetic recording medium, and the average value of the measurement data was obtained. Further, the average values at each radial position were averaged and defined as the glide noise of the magnetic recording medium. The floating amount of the glide head was 8 nm. In general, when the speed of the glide head relative to the revolving magnetic recording medium changes, the floating amount also varies. Then, to avoid a change in the floating amount, the revolution of the magnetic recording medium was changed each time the glide head moved so that the relative speed became fixed even when the radial position changed. Although the voltage of the piezoelectric element was output through an amplifier and frequency divider, the gain of the amplifier was 60 dB, and the band of the frequency divider was 100 kHz to 2 MHz.

As a result of this evaluation, the glide noise of sample No. 3 was very low at 11 mV as an average value of three magnetic disks. Thus, it could be confirmed that stable flyability was obtained. Writing and reading of data could not be carried out stably with a combination of a magnetic head and a disk having a glide noise of more than 30 mV.

In a reliability test, a magnetic disk medium having the lubricant layer 38 formed on the substrate 1 was set in a known evaluation apparatus equipped with a magnetic head loading/unloading unit to carry out the test. A loading/unloading test accompanied by "seek" was carried out 50,000 times by turning ten magnetic disks at a revolution of 15,000 rpm. In this test, after the magnetic head was loaded from the outer side portion of the disk (outer side from R=40 mm) in a lump and sought to the inner side portion (R=19 mm) at a floating amount of 10 nm, the magnetic head was unloaded from the outer side portion. As a result of this evaluation, the used ten magnetic disks could be evaluated without being crashed.

Further, when the thickness of the lubricant layer 38 of the magnetic disk after the test was measured by FT-IR, it was 1.6 nm and it could be confirmed that the thickness was rarely reduced. When these samples were observed through a microscope after they were tested, a scratch was not seen on all the ten magnetic disks.

As a result, the magnetic recording medium of the invention had satisfactory bonding force with the lubricant and satisfactory slide resistance reliability even when the thickness of the protective layer had a small thickness of 3.5 nm.

It was verified from the above results that sample No. 3 prepared by the above method was excellent in the low floating stability of the head and slide resistance reliability with sufficient bonding properties with the lubricant even when the thickness of the DLC protective layer was very small at 3.5 nm. The results are shown in FIGS. 10. 11 and 12.

(Embodiment 5)

Figure 12:
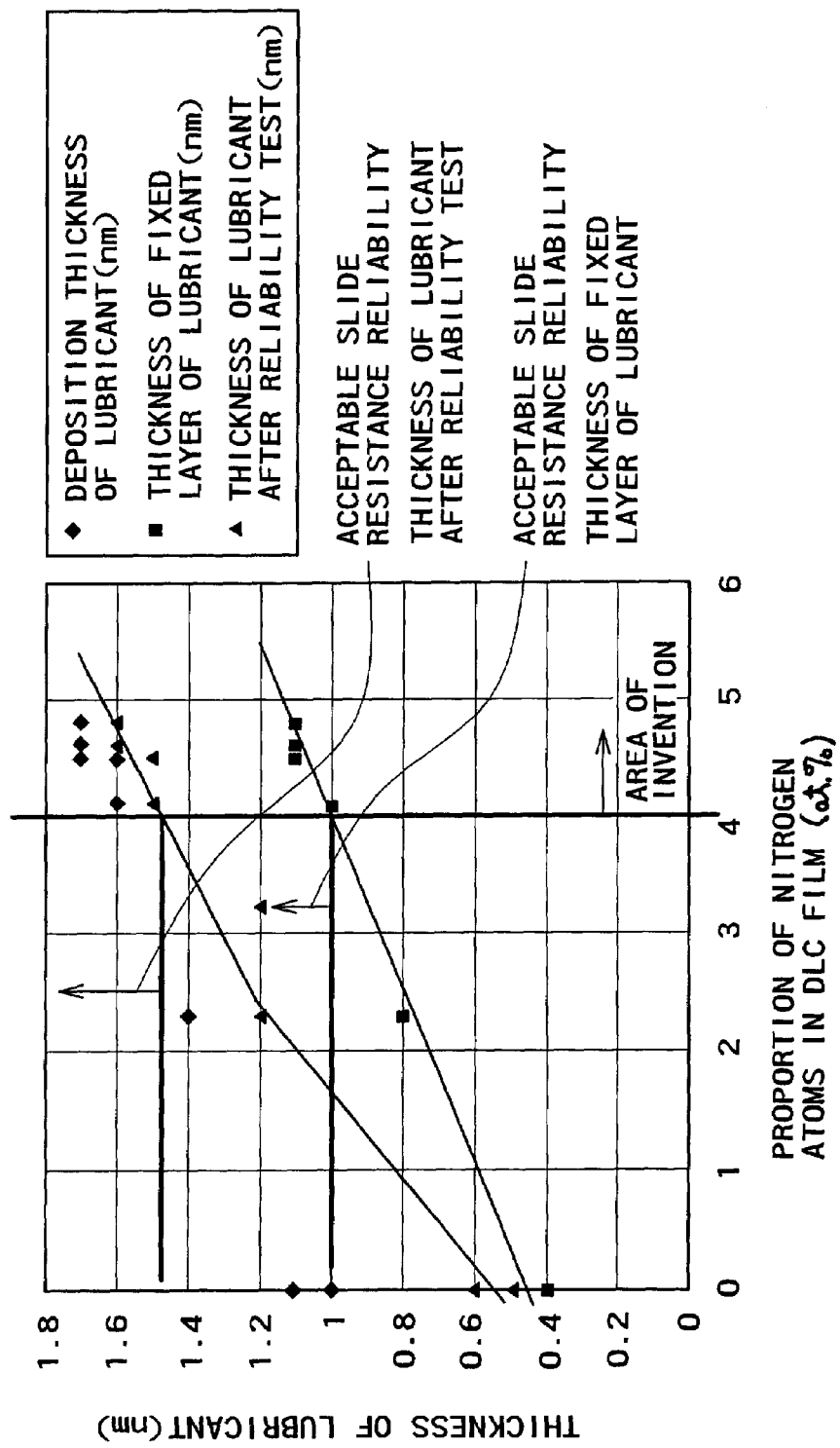
FIG. 12 is a graph showing the relationship between the proportion of nitrogen atoms contained in the DLC layer and the thicknesses of three lubricants of each sample and the results of slide resistance reliability.

Before the DLC protective layer 37 was formed, sample Nos. 8, 9 and 10 were prepared in the same manner as sample No. 3 of Embodiment 4 except that the method of controlling the flow rate of an ethylene gas was changed. That is, sample No. 8 was prepared by introducing an ethylene gas ($C_2H_4$) gas at 42 sccm for 0.9 seconds, at 37 sccm for 1.5 seconds, at 32 sccm for 2.2 seconds, at 27 sccm for 2.9 seconds and 22 sccm for 3.6 seconds stepwise through a mass flow controller and stopping the supply of the gas. Sample No. 9 was prepared by introducing an ethylene gas ($C_2H_4$) gas at 44 sccm for 0.9 seconds, at 39 sccm for 1.5 seconds, at 34 sccm for 2.1 seconds, at 29 sccm for 2.7 seconds and 24 sccm for 3.4 seconds stepwise through a mass flow controller and stopping the supply of the gas. Sample No. 10 was prepared by introducing an ethylene gas ($C_2H_4$) gas at 46 sccm for 0.8 seconds, at 41 sccm for 1.4 seconds, at 36 sccm for 2.0 seconds, at 31 sccm for 2.6 seconds and 26 sccm for 3.2 seconds stepwise through a mass flow controller and stopping the supply of the gas. The application of an anode voltage and bias voltage was started 0.3 seconds after the introduction of the gas and continued until the supply of these gases was stopped after the induction of plasma. The thicknesses of the DLC protective layer layers 37 of sample Nos. 8, 9 and 10 were all 3.5 nm. These samples were evaluated in the same manner as sample No. 3 and the obtained results are shown in FIGS. 10, 11 and 12.

As a result, the proportions of hydrogen atoms on the surface of DLC of sample Nos. 8, 9 and 10 were 27%, 29% and 30%, respectively. The proportions of hydrogen atoms contained in the interior of DLC of sample Nos. 8, 9 and 10 were 37%, 39% and 40%, respectively. The proportions of nitrogen atoms contained in the DLC protective layer of sample Nos. 8, 9 and 10 were 4.6%, 4.5% and 4.5%, respectively.

The thicknesses of the lubricant layers 38 of sample Nos. 8, 9 and 10 were 1.7 nm, 1.7 nm and 1.6 nm, respectively which were almost the same as that of sample No. 3. The thicknesses of the fixed layers of lubricants chemically bonded of sample Nos. 8, 9 and 10 were all 1.1 nm which was almost the same as that of sample No. 3.

As for glide noise as an average value of three magnetic disks when the flyability of the magnetic head were evaluated, glide noise of sample No. 8 was 15 mV, that of sample No. 9 was 18 mV and that of sample No. 10 was 25 mV. Thus, it could be confirmed that stable flyability are obtained.

As for the results of the reliability test, all the 10 magnetic disks of sample Nos. 8, 9 and 10 could go through 50,000 times of the test, and a scratch was not seen on these samples by observation through a microscope thereafter. Further, when the thickness of the lubricant layer of each magnetic disk after the test was measured by FT-IR, the thickness of sample No. 8 was 1.6 nm, that of sample No. 9 was 1.5 nm and that of sample No. 10 was 1.5 nm. Thus, it could be confirmed that the thickness of each sample rarely decreased.

As a result, it was verified that the magnetic recording medium of the invention had sufficient bonding force with the lubricant and satisfactory slide resistance reliability even when the thickness of the protective layer was very small at 3.5 nm.

COMPARATIVE EXAMPLE 2

Sample No. 4 was prepared in the same manner as sample No. 3 in Embodiment 4 except that a nitrous oxide gas was not supplied to form a DLC protective layer 37 and the flow rate of the ethylene gas was fixed at 30 sccm. The thickness of the DLC protective layer 37 was 3.5 nm. This sample was evaluated in the same manner as sample No. 3 and the obtained results are shown in FIGS. 10, 11 and 12.

As a result, the proportion of hydrogen atoms on the surface of DLC was 35%, the proportion of hydrogen atoms in the interior of DLC was 37%, and the proportion of nitrogen atoms contained in the DLC protective layer was below the detection limit.

The thickness of the lubricant layer 38 was 1.1 nm which was smaller than that of sample No. 3, and the thickness of the fixed layer of the lubricant chemically bonded was very small at 0.4 nm.

Glide noise when the flyability of the magnetic head were evaluated was extremely large at 53 mV as an average value of three magnetic disks. It was found that the magnetic disk was inferior in the low-floating stability of the magnetic head.

As for the results of the reliability test, 5 out of 10 magnetic disks slid and could not go through 50,000 times of the test. Although the remaining 5 magnetic disks could go through 50,000 times of the test, a scratch was seen on the surfaces of all the 5 magnetic disks by observation through a microscope thereafter. Further, when the thickness of the lubricant layer 38 of the magnetic disk after the test was measured by FT-IR, it could be confirmed that it was reduced to 0.6 nm.

It could be verified from the above results that the magnetic disk of sample No. 4 could not obtain magnetic head low-floating stability and slide resistance reliability due to unsatisfactory adhesion and bonding properties of the lubricant layer 38.

COMPARATIVE EXAMPLE 3

Sample No. 5 was prepared in the same manner as sample No. 3 of Embodiment 4 except that the flow rate of an ethylene gas was fixed at 30 sccm to form a DLC protective layer 37. The thickness of the DLC protective layer 37 was 3.5 nm. This sample was evaluated in the same manner as sample No. 3, and the obtained results are shown in FIGS. 10, 11 and 12.

As a result, the proportion of hydrogen atoms on the surface of DLC was 31%, the proportion of hydrogen atoms in the interior of DLC was 36%, and the proportion of nitrogen atoms contained in the DLC protective layer was 4.1%.

The thickness of the lubricant layer 38 was 1.6 nm which was almost the same as sample No. 3, and the thickness of the fixed layer of the lubricant chemically bonded was 1.0 nm which was almost the same as sample No. 3.

Glide noise when the flyability of the magnetic head were evaluated was very large at 55 mV as an average value of three magnetic disks. Thus, it was found that the magnetic disk was inferior in the low-floating stability of the magnetic head.

As for the results of the reliability test, all the ten magnetic disks could go through 50,000 times of the test, and a scratch was not seen on them by observation through a microscope thereafter. Further, when the thickness of the lubricant layer of the magnetic disk after the test was measured by FT-IR, it could be confirmed that the thickness was 1.5 nm which was rarely reduced from the value before the test.

It could be confirmed from the above results that the magnetic disk of sample No. 5 had almost the same slide resistance reliability as sample No. 3 of Embodiment 4 with satisfactory adhesion and bonding properties of the lubricant layer 38 but could not obtain the low-floating stability of the magnetic head.

COMPARATIVE EXAMPLE 4

Sample No. 6 was prepared in the same manner as sample No. 3 of Embodiment 4 except that the nitrous oxide gas was not added to form the DLC protective layer 37. The thickness of the DLC protective layer 37 was 3.5 nm. This sample was evaluated in the same manner as sample No. 3, and the obtained results are shown in FIGS. 10, 11 and 12.

As a result, the proportion of hydrogen atoms on the surface of DLC was 32%, the proportion of hydrogen atoms in the interior of DLC was 36%, and the proportion of nitrogen atoms contained in the DLC protective layer was below the detection limit.

The thickness of the lubricant layer 38 was 1.0 nm which was smaller than sample No. 3, and the thickness of the fixed layer of the lubricant chemically bonded was extremely small at 0.4 nm.

Glide noise when the flyability of the magnetic head were evaluated was very large at 42 mV as an average value of three magnetic disks. Thus, it was found that the magnetic disk was inferior in the low-floating stability of the magnetic head.

As for the results of the reliability test, 7 out of 10 magnetic disks slid and could not go through 50,000 times of the test. Although the remaining 3 could go through 50,000 times of the test, a scratch was seen on the surfaces of all the three magnetic disks by observation through a microscope thereafter. Further, when the thickness of the lubricant layer of the magnetic disk after the test was measured by FT-IR, it could be confirmed that the thickness was reduced to 0.5 nm.

It could be confirmed from the above results that the magnetic disk of sample No. 6 could not obtain the low-floating stability of the magnetic head and slide resistance reliability due to unsatisfactory adhesion and bonding properties of the lubricant layer 38.

COMPARATIVE EXAMPLE 5

Sample No. 7 was prepared in the same manner as sample No. 3 of Embodiment 4 except that a nitrogen gas was added in place of the nitrous oxide gas to form a DLC protective layer 37. The thickness of the DLC protective layer 37 was 3.5 nm. This sample was evaluated in the same manner as sample No. 3, and the obtained results are shown in FIGS. 10, 11 and 12.

As a result, the proportion of hydrogen atoms on the surface of DLC was 32%, the proportion of hydrogen atoms in the interior of DLC was 37%, and the proportion of nitrogen atoms contained in the DLC protective layer was 2.3%.

The thickness of the lubricant layer 38 was 1.4 nm which was smaller than sample No. 3, and the thickness of the fixed layer of the lubricant chemically bonded was 0.8 nm which was smaller than sample No. 3.

Glide noise when the flyability of the magnetic head were evaluated was large at 38 mV as an average value of three magnetic disks. Thus, it was found that the magnetic disk was inferior in the low-floating stability of the magnetic head.

As for the results of the reliability test, one out of 10 magnetic disks slid and could not go through 50,000 times of the test. Although the remaining 9 could go through 50,000 times of the test, a scratch 0was seen on the surfaces of 6 magnetic disks by observation through a microscope thereafter. Further, when the thickness of the lubricant layer of the magnetic disk after the test was measured by FT-IR, it could be confirmed that the thickness was reduced to 1.2 nm.

It could be confirmed from the above results that the magnetic disk of sample No. 7 could not obtain the low-floating stability of the magnetic head and slide resistance reliability due to unsatisfactory adhesion and bonding properties of the lubricant layer 38.

When Embodiment 4 and Comparative Examples 2 to 5 are taken into consideration, it could be confirmed that in the magnetic disk of sample No. 3 in Example 4, the factor of preventing the magnetic head from floating at a low level (low-floating prevention factor) was removed by reducing the supply of ethylene as a material gas stepwise to reduce the proportion of hydrogen atoms to carbon atoms on the surface of the DLC protective layer 37 and adding a nitrous oxide gas to reduce the proportion of hydrogen atoms to carbon atoms on the surface of the DLC protective layer 37. The addition of the nitrous oxide gas has the effect of including a larger number of nitrogen atoms in the DLC protective layer 37, whereby the adhesion and chemical bonding properties of the lubricant layer 38 are improved to obtain satisfactory slide resistance reliability.

In Embodiment 4, the supply of ethylene as a material gas is reduced stepwise. It is needless to say that when the supply of ethylene is continuously reduced, the same effect can be obtained. It is a matter of course that the same effect is obtained by reducing the partial pressure by changing the exhaust speed in place of the supply.

According to the invention, the bonding performance between the protective layer and the lubricating layer can be reinforced. Furthermore, a mass-stored and high reliability magnetic disc apparatus can be provided by combining the magnetic recording medium with the magnetic head.

A magnetic recording medium having excellent magnetic head low-flyability and a protective layer with excellent bonding properties with a lubricant layer and high slide resistance can be realized:

What is claimed is:

1. A magnetic recording medium having a magnetic layer on a substrate by intercalating at least an under layer, wherein said medium further comprises a protective layer for protecting said magnetic layer, and said protective layer is a diamond-like carbon (DLC) layer mainly composed of carbon, a content of hydrogen, in at. %, in a portion (surface layer) from a surface to a depth of 1 nm of said protective layer is smaller than a content, in at. %, of hydrogen in a portion from said 1 nm surface layer to a magnetic layer side of said protective layer, wherein the content of hydrogen in said surface layer is 30 at. % or less.

2. The magnetic recording medium according to claim 1, wherein said protective layer further contains nitrogen atoms.

3. The magnetic recording medium according to claim 2, wherein a proportion of nitrogen atoms to carbon atoms in said DLC protective layer is 4% or more.

4. The magnetic recording medium according to claim 2, further comprising a lubricant layer on said protective layer.

5. The magnetic recording medium according to claim 4, wherein said lubricant layer is comprised of a perfluoropolyether.

6. The magnetic recording medium according to claim 1, wherein a proportion of functional groups per 100 carbon atoms in said protective layer is more than 20%.

7. The magnetic recording medium according to claim 1, wherein said content, in at. %, of hydrogen in said protective layer decreases continuously or stepwise in a thickness direction of said protective layer.

* * * * *